(12) United States Patent
Aschpurwis

(10) Patent No.: US 11,420,833 B2
(45) Date of Patent: Aug. 23, 2022

(54) LINEAR SORTER HAVING VARIABLY RUNNING CROSS-BELT SUPPORTS

(71) Applicant: SIEMENS AKTIENGESELLSCHAFT, Munich (DE)

(72) Inventor: Carsten Aschpurwis, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/293,569

(22) PCT Filed: Nov. 1, 2019

(86) PCT No.: PCT/EP2019/079959
§ 371 (c)(1),
(2) Date: May 13, 2021

(87) PCT Pub. No.: WO2020/099149
PCT Pub. Date: May 22, 2020

(65) Prior Publication Data
US 2022/0002098 A1 Jan. 6, 2022

(30) Foreign Application Priority Data
Nov. 13, 2018 (EP) .................................... 18206077

(51) Int. Cl.
*B65G 54/02* (2006.01)
*B65G 47/71* (2006.01)
*B65G 47/96* (2006.01)

(52) U.S. Cl.
CPC ............ *B65G 54/02* (2013.01); *B65G 47/71* (2013.01); *B65G 47/96* (2013.01); *B65G 2203/0291* (2013.01)

(58) Field of Classification Search
CPC .... B65G 47/945; B65G 17/345; B65G 54/02; B65G 47/71; B65G 47/96; B65G 2203/0291
(Continued)

(56) References Cited

U.S. PATENT DOCUMENTS 3,550,748 A * 12/1970 Werner ................ B65G 17/345
198/370.06
6,273,268 B1 * 8/2001 Axmann .............. B65G 17/345
198/370.06
(Continued)

FOREIGN PATENT DOCUMENTS

DE 102010027925 A1 10/2011
DE 102014117150 A1 5/2016
(Continued)

*Primary Examiner* — James R Bidwell
(74) *Attorney, Agent, or Firm* — Laurence A. Greenberg; Werner H. Stemer; Ralph E. Locher

(57) ABSTRACT

A linear sorter sorts piece goods. The linear sorter contains a closed circulation of tracks having a plurality of cross-belt elements, in which the piece goods are transported on an upper run on the cross-belt elements and are sorted by unloading to corresponding destination points, and the cross-belt elements return on a lower run. The cross-belt elements are driven by linear motors. In order to simplify the maintenance and to have to keep fewer cross-belt elements available as replacement components, the linear motors for the cross-belt elements are controlled such that, as the cross-belt elements return on the lower run, the speed of the cross-belt elements is higher than the speed of the cross-belt elements while travelling on the upper run.

8 Claims, 2 Drawing Sheets

(58) Field of Classification Search
USPC .......................................... 198/370.06, 371.2
See application file for complete search history.

(56) References Cited

U.S. PATENT DOCUMENTS

| | | | |
|---|---|---|---|
| 7,861,844 B2 * | 1/2011 | Hayduchok | B61C 11/04 |
| | | | 198/370.1 |
| 8,033,379 B2 * | 10/2011 | Syndikus | B65G 17/345 |
| | | | 198/370.06 |
| 8,827,071 B2 | 9/2014 | van de Loecht | |
| 9,873,573 B2 | 1/2018 | Wiesmann | |
| 10,106,339 B2 | 10/2018 | Pruessmeier | |
| 10,464,759 B2 | 11/2019 | Lykkegaard | |
| 10,583,390 B2 | 3/2020 | Fuerst et al. | |
| 2011/0127140 A1 * | 6/2011 | Brunsen | B65G 47/962 |
| | | | 198/348 |
| 2016/0297619 A1 | 10/2016 | Hahn | |

FOREIGN PATENT DOCUMENTS

| | | |
|---|---|---|
| EP | 1216938 A1 | 6/2002 |
| EP | 3176111 A1 | 6/2017 |
| WO | 9627544 A1 | 9/1996 |
| WO | 2014195392 A1 | 12/2014 |
| WO | 2017009276 A1 | 1/2017 |
| WO | 2017092763 A1 | 6/2017 |

\* cited by examiner

LINEAR SORTER HAVING VARIABLY RUNNING CROSS-BELT SUPPORTS

BACKGROUND OF THE INVENTION

Field of the Invention

The present invention relates to a line sorter with variably running cross-belt carriers as claimed in the independent claim.

The invention is based on the field of sorting systems. Sorting systems identify heterogeneously shaped and isolated piece goods that arrive in an unsorted order, for example packages (in package sorting centers), items of luggage (in airport terminals) or goods on consignment (in mail order companies) on the basis of specified distinguishing criteria and distribute them to defined destinations. Sorting systems of this kind comprise sorting installations, which with appropriate organizational operations and adapted operating strategies, which are implemented in associated controllers in the sorting installations or sorting systems, guarantee the system functionality of the sorting systems.

A sorter of this kind itself comprises a merge table, a distributing conveyor and end/destination points for the piece goods to be distributed.

With technique-oriented classification of distributing conveyors according to the criteria type of occupancy, operating principle of a discharge of the piece goods and conveying principle, a distinction is made, in particular, between distributing conveyors with cross-belt or transverse belt technology or tilt tray technology. For short, these are referred to as cross-belt conveyors/cross-belt sorters or tilt tray sorters. They can be designed as horizontal circular sorters or as vertical circular sorters (line sorters, linear sorters).

Disclosed in documents [1] to [6] are what are known as line sorters in which the carriage length is shorter than the maximum transportable goods length. Common to these line sorters is that a plurality of cross-belt carriers (hereinafter referred to synonymously as cross-belt carriages throughout, however) is located on a closed loop. When the cross-belt carriages are on the upper strand, they are carrying piece goods to be sorted. The cross-belts are typically narrower (in the sorting direction) than the piece goods to be sorted. Piece goods, which are transferred onto the sorter, in most cases rest on more than one cross-belt carriage, therefore. For actuation of the cross-belts as the goods are transferred or discharged it is only important to know which cross-belt carriages are located under the one item of piece goods. The cross-belts of the relevant cross-belt carriages are actuated accordingly for this purpose. Optionally, a plurality of cross-belts have to be operated synchronously if relatively large piece goods rest on a plurality of cross-belt carriages and on a plurality of cross-belts, therefore. The cross-belt carriages return on the lower strand. FIG. 1 shows a line sorter of this kind, as is revealed in document [4]. This plurality of cross-belt carriages is driven by a linear motor system. Common to the various documents disclosed in documents [1] to [6] is that the individual cross-belt carriages are mechanically coupled together. This coupling is also incorporated in the relevant independent claims in documents [1] to [3].

A sorting installation with cross-belt carriages coupled in this way has various disadvantages, in particular:

i) The cross-belt carriages, and primarily the cross-belts and their drives, are exposed to wear and have to be replaced if necessary, therefore.
Replacement of cross-belt carriages requires the sorting installation to be shut down. Owing to the reciprocal coupling of the cross-belt carriages, the replacement of cross-belt and its drives cannot be effected in practical terms and this entails removal of a defective cross-belt carrier and installation of an intact cross-belt carrier, therefore. This is associated with considerable expenditure and with corresponding downtimes.

ii) Typically, invariably only the cross-belt carriage on the upper strand is used for transportation of the piece goods. The cross-belt carriages located on the lower strand move back empty until they are used on the upper strand for further transportation of piece goods. This constitutes a waste of a line sorter's resources.

iii) Since the downtimes of the sorting installation should be kept as short as possible, the operator of the sorting installation has to have the cross-belt carriages in stock. In addition to requiring storage space, this is expensive in respect of the costs for having to keep such cross-belt carriages available.

SUMMARY OF THE INVENTION

The present invention is therefore based on the object of disclosing a line sorter of the above-mentioned type, which can be operated without the drawbacks cited above.

This object is achieved by the measures disclosed in the independent claim. Advantageous embodiments of the invention are disclosed in the further claims.

The inventive solution provides a line sorter for sorting piece goods, comprising:

a closed loop of a plurality of cross-belt carriages, wherein the piece goods are transported on an upper strand on the cross-belt carriages and are sorted by discharging to corresponding destination points, and wherein the cross-belt carriages return on a lower strand and wherein one drive means is provided per cross-belt carrier, which can be actuated such that every cross-belt carrier on the loop can each have an individual speed.

This may result in the following advantages:

i) The inherent drawback of a line sorter, that, typically, only ever the upper strand is used for transportation of goods and the lower strand is occupied by empty cross-belt carriages, can be significantly rectified by a higher return speed of the cross-belt carriages. The number of the cross-belt carriages per line sorter can be reduced hereby.

ii) The gap between the cross-belt carriages on the upper strand can be adjusted by individual actuation of the drive means of every cross-belt carriage such that the necessary number of cross-belt carriages for the relevant piece goods are defined on the basis of a measurement of the dimension (=size) and/or the time-dependent position of the piece goods to be conveyed. Inherent to any sorting system, and also to line sorters, therefore, is that the piece goods to be sorted were detected in advance anyway by detectors in respect of sorting destination and dimension and are stored in an open loop control/a closed loop control or an IT system and, in accordance therewith, the detected data can be used for actuation of the cross-belt carriages. Similarly inherent to any line sorter is that the location of every cross-belt carriage on the upper strand is continually detected and stored in a control system or in an IT system since the location of discharge, and therewith the operation of the cross-belt, is essential to the functioning of the line sorter. Said adjustment of the gap between the cross-belt carriages allows the piece goods to be fed to the line sorter independently of their dimension. This also includes the special case where relatively small piece goods are being fed, so only a single cross-belt carriage has to be provided. The number introduced above is one in this case.

iii) Optionally the cross-belt carriages can be moved on the upper strand with a constant gap or with a constant pitch due to individual actuation of the drive means of every cross-belt carriage. Inherent to any sorting system, and also to line sorters, therefore, is that the piece goods to be sorted were detected in advance anyway by detectors in respect of sorting destination and dimension and are stored in a controller or an IT system and, in accordance therewith, the detected date can be used for the actuation of the cross-belt carriages.

iv) Linear motors can be provided as the drive means of the cross-belt carriages, so the permanent magnets are fitted in the cross-belt carriages and the series of electromagnets generating an electromagnetic alternating field is arranged in the two strands and in regions called turning points.

v) As an alternative, a separate drive with, for example, a rotative electric motor can be provided as drive means for each cross-belt carrier. The energy can be optionally transferred from the supporting frame to the cross-belt carriages via busbars or contactlessly via induction. In this case, one accumulator is to be provided per cross-belt carriage.

vi) Further possibilities for the drive of the cross-belt carriages:

Friction wheels can be provided on the supporting frame, and these act on a contact surface of the cross-belt carrier. Similarly it is possible for the cross-belt carriages to link, for example on the straight sections, into a medium with positive locking (chain, belt). In this case, this medium runs in the upper strand with $V_{sort}$ and in the lower strand with $V_{ret}$. The acceleration in the diversions can be implemented using the above-mentioned techniques. The cross-belt carriages should not be regarded as permanently coupled in the case of a medium with positive locking either since this coupling is omitted respectively at the diversions. Documents [1] to [6] provide a permanent coupling over the entire loop.

Further advantageous embodiments are disclosed in the dependent claims.

The invention will be explained by way of example and in more detail below with reference to the drawings.

DETAILED DESCRIPTION OF THE INVENTION

Figure 1:
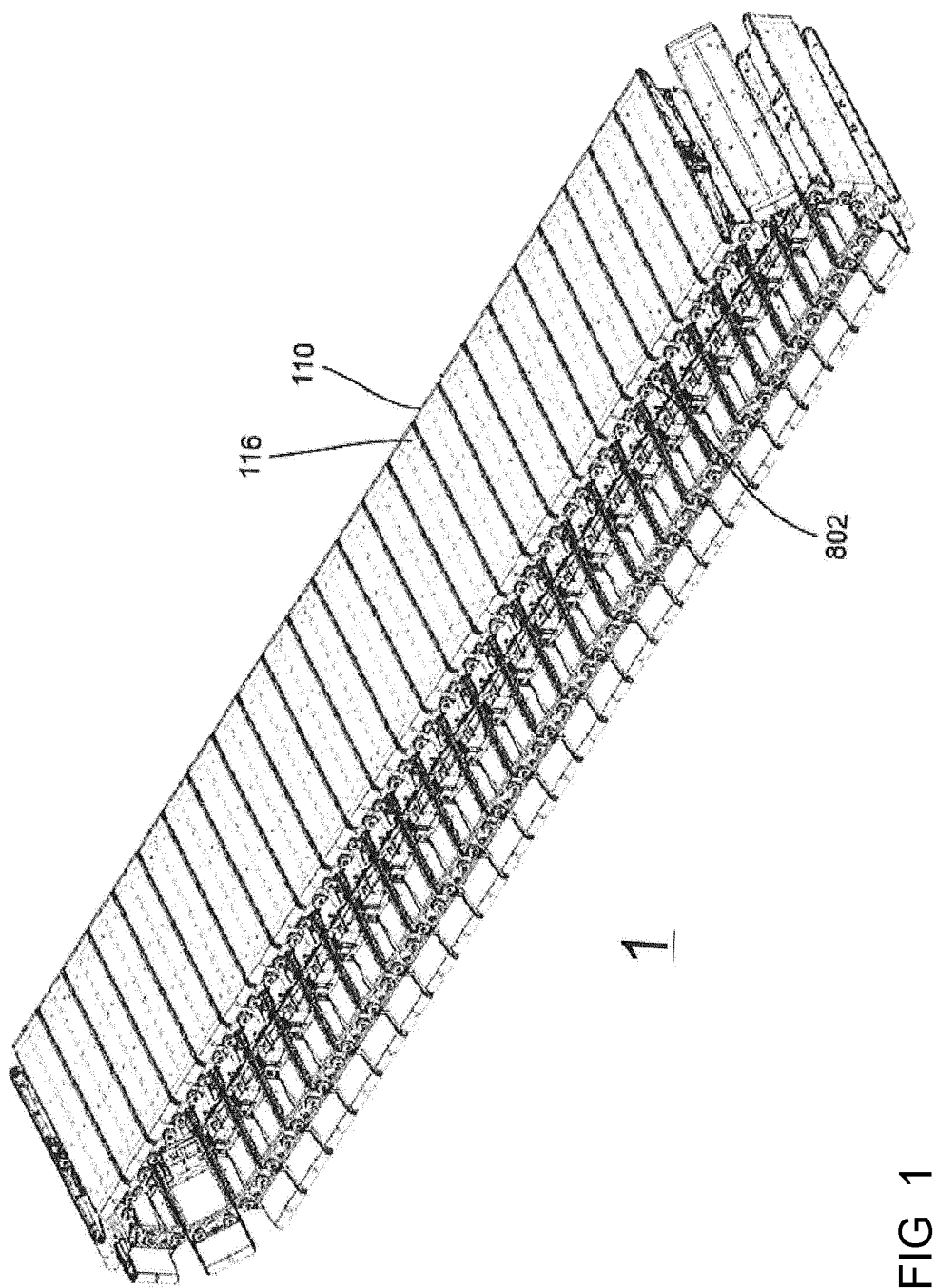
FIG. 1 shows line sorter with cross-belt carriers according to documents [4] and [5] prior art.

FIG. 1 shows the habitual prior art with a line sorter 1, wherein the cross-belt carriages 110 are permanently coupled together. Each cross-belt carriage 110 comprises a cross-belt 116. This prior art can also be found in the patent application according to document [6], which was only recently published, in which a linear motor is likewise provided for the drive of the cross-belt carriages. See, for example, FIG. 3 in said document [6]. It is only in order to be able to easily establish the relationship to documents [4] and [5] that the reference characters of those documents have been used. Reference is made to FIG. 1 in document [3] in respect of the arrangement of the destination points along a line sorter. The target points are provided with the term "discharge" in this document.

Figure 2:
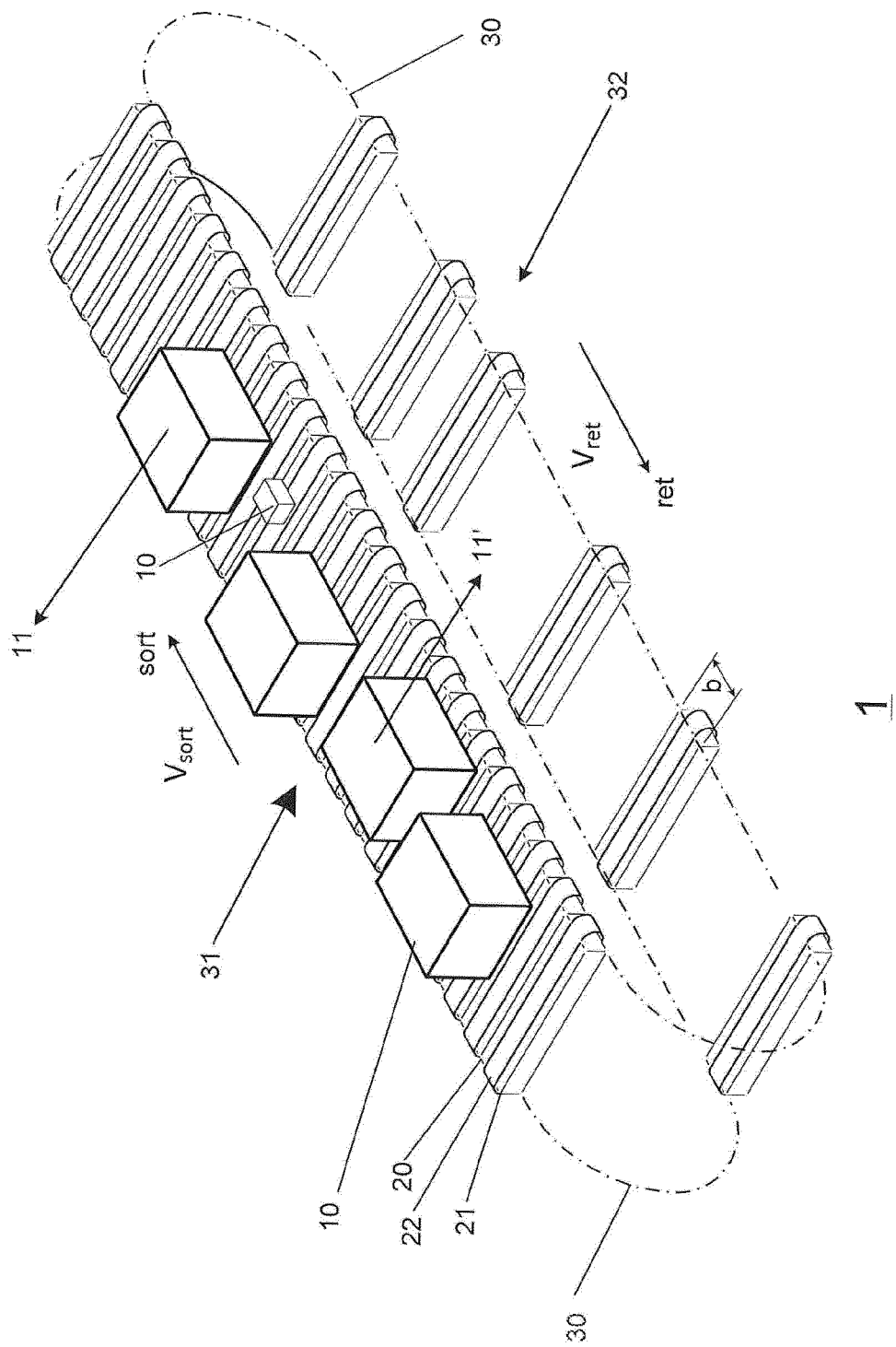
FIG. 2 shows line sorter with cross-belt carriages in an embodiment of the present invention.

FIG. 2 shows a line sorter 1 according to one embodiment of the present invention. Contained on a path with guide tracks 31 (not shown in detail in FIG. 2), the cross-belt carriages 21 run freely among one another to the extent that each cross-belt carriage is individually driven by drive means. The drive means can be a conventional electric motor. It is preferably a linear motor, however (not shown in FIG. 2). The individual drive of the cross-belt carriages obviously presupposes that the individual cross-belt carriages 21 are not mechanically coupled together, contrary to the habitual prior art according to documents [1] to [6], therefore.

Owing to the omission of the coupling of the individual cross-belt carriages 21, the following should be arranged in respect of track guiding along the path 31:

To achieve adequate track guiding with what are known as "narrow" or "short" cross-belt carriages 21, the support of the cross-belt carriage 21 in the sorting direction sort has to be longer than that of the width b of a cross-belt carriage 21. This can be achieved by a cross-belt carriage 21 only ever being guided in the track 30 on one side and the following cross-belt carriage 21 being guided on the other side of the track 30. In this way, the width of the guide in the track is slightly less than three times the width b of a cross-belt carriage 21. In addition it can be provided that, opposite the wide guide, only one roller meshes in the guide 30, so the width of the guide 30 becomes slightly narrower but is still more than twice the width b of a cross-belt carriage 21.

If, contrary to said habitual prior art, the cross-belt carriages 21 are now NOT coupled but loosely run one after another, the number of cross-belt carriages 21 can be reduced. Located on the upper strand 31 is a series of cross-belt carriages 21 moving one after another and whose gap 20 is adjustable, likewise due to the individual actuation of every linear motor per cross-belt carriage 21. As soon as the piece goods 10 are discharged at the end of the sorting line in a discharge direction 11, 11', the cross-belt carriages 21 are greatly accelerated one after the other and return on the lower strand 32 at a much higher speed $V_{ret}$. This higher speed $V_{ret}$ refers to the typical (lower) sorting speed $V_{sort}$. Gaps form between the cross-belt carriages in the process. The number of cross-belt carriages 21 over the entire line is much lower then with endlessly coupled cross-belt carriages 21, therefore. In relation to the term "strand", reference is made at this point to document [8] for an explanation thereof.

In relation to the term "linear motor", reference is made firstly to document [7]. Secondly, the linear motor per cross-belt carriage 21 is formed by a permanent magnet, which is permanently arranged in the cross-belt carriage 21 and by a series of electromagnets generating an electromagnetic alternating field. These electromagnets are successively arranged in the two strands 31 and 32 and in the regions called turning points here, which connect the two strands 31 and 32.

Just before the "emergence" of the cross-belt carriages 21 on the upper strand 31 for renewed loading, the return carriages on the upper column of cross belt carriages 21, which is running in a gap-free manner, catch up, but at least the time-dependent position of the carriages/carriers is matched to the goods to be transferred. Said "emergence" takes place at the turning point introduced above.

A plurality of cross-belt carriages on the upper strand 31 can be combined particularly advantageously into a group in order to process larger piece goods on the line sorter 1. Larger piece goods means that piece goods of this kind have to be placed on a plurality of cross-belt carriages 21. For this, the dimension (size) of the piece goods 10 to be processed has to be recorded. The number of required cross-belt carriages 21 can be defined using this dimension and the known width b of a cross-belt carriage 21—cf. FIG. 2. The transfer position is specified by the construction, and the transfer time of piece goods to be sorted on the linear conveyer is specified by the underlying IT system. As a result, the cross-belt carriages 21 arriving from the lower strand 32 via the diversion, due to the individual capacity for actuation, may be actuated such that the piece goods 10 to be sorted can be placed exactly onto the defined number of cross-belt carriages 21. With the designated sorting destination all cross-belts 21 of the relevant cross-belt carriages 21 are accordingly activated in order to discharge the piece goods in one of the discharge directions 11, 11'. The group formation is provided purely virtually for particular piece goods. After discharging of the piece goods, the cross-belt carriages that have become available no longer belong to a group.

The individual capacity for actuation of the cross-belt carriages 21 also allows a large number of configurations on the upper strand 31 in order to feed the piece goods 1 to be sorted optimally to the destination points. A variably adjustable speed $V_{sort}$, for example, is also conceivable, wherein this speed $V_{sort}$ can be defined depending on the type, mass and dimension of the piece goods 1 to be sorted.

In summary, the invention allows free circulating of a plurality of cross-belt carriages 21 with adjustable gaps and adjustable individual speeds, comparable to the cars on a lane of a freeway. Overtaking of cross-belt carriages 21 is ruled out more or less by definition in the case of a line sorter 1.

LIST OF REFERENCE CHARACTERS, GLOSSARY 1 line sorter
10 piece goods, packet
11, 11' discharge direction
20 interval, distance, gap
21 cross-belt carriage, cross-belt carrier, carriage, carrier
22 cross-belt
30 guiding track, guide
31 upper strand
32 lower strand
108 belt
110 cross-belt carriage, carriage, cross-belt carrier, carrier, carriage according to the prior art
116 cross-belt
802 conveyance portion
ret return direction
sort sorting direction
$V_{sort}$ speed of the cross-belt carriages in the sorting direction
$V_{ret}$ speed of the cross-belt carriages on return

LIST OF CITED DOCUMENTS

[1] WO 2016/206695 A1 "LINE SORTER"; BEUMER GROUP A/S, DK-8200 Aarhus N
[2] WO 2017/092763 A1 "SORTER WITH REDUCED POYGON EFFECT"; BEUMER GROUP A/S, DK-8200 Aarhus N
[3] WO 2017/108048 A1 "LINE SORTER WITH ADJUSTABLE TRACK LENGTH"; BEUMER GROUP A/S, DK-8200 Aarhus N
[4] U.S. Pat. No. 9,809,388 B2 "CROSS BELT SLAT SORTER"; Bastian Solutions, LLC, Indianapolis UN (US)
[5] U.S. Pat. No. 9,409,716 B2 "CROSS BELT SLAT SORTER"; Bastian Solutions, LLC, Indianapolis UN (US)
[6] US 2018/0170690 A1 "LINE SORTER"; BEUMER GROUP A/S, DK-8200 Aarhus N
[7] [Linear motor https://de.wikipedia.org.wiki/Linearmotor
[8] Strand designates a part or branch of a running tensile unit https://de.wikipedia.org/wiki/Trum_(Maschinenbao)

The invention claimed is:

1. A line sorter for sorting piece goods, the line sorter comprising:
 a closed loop defined by tracks having an upper strand and a lower strand and a plurality of cross-belt carriages carried along said closed loop, said closed loop having one of said tracks disposed on each of two sides along said closed loop for guiding of said cross-belt carriages, wherein the piece goods are transported in a sorting direction on said upper strand of said closed loop on said cross-belt carriages and the piece goods are sorted by discharging to corresponding destination points along an extent of said upper strand and, wherein said cross-belt carriages return on said lower strand of said closed loop; and
 one drive means provided per cross-belt carriage of said cross-belt carriages, said one drive means being actuated for setting an individual speed of said cross-belt carriages on said closed loop.

2. The line sorter according to claim 1, wherein said plurality of cross-belt carriages is formed as a group, so said cross-belt carriages of said group on said upper strand have an identical adjustable speed.

3. The line sorter according to claim 1, wherein a size of the piece goods to be sorted is detected, and on a basis of the size, a number of said cross-belt carriages required for transference is defined, and wherein each of said one drive means for a required number of said cross-belt carriages are actuated on a basis of a specified transfer position of the piece goods on the line sorter such that the piece goods to be sorted can be placed onto the required number of said cross-belt carriages.

4. The line sorter according to claim 1, wherein after discharging the piece goods at a last target point in the sorting direction, a relevant said cross-belt carriage is accelerated.

5. The line sorter according to claim 1, wherein said guide of said cross-belt carriages is provided with a support alternately only on one of said tracks and said support extends over an immediately adjacent one of said cross-belt carriages.

6. The line sorter according to claim 5, wherein said cross-belt carriages each have a roller that meshes with the other of said two tracks on a side of each of said cross-belt carriages facing away from said support.

7. A line sorter for sorting piece goods, the line sorter comprising:
 a closed loop having tracks and a plurality of cross-belt carriages, wherein the piece goods being transported in a sorting direction on an upper strand of said closed loop on said cross-belt carriages and being sorted by discharging to corresponding destination points and, wherein said cross-belt carriages return on a lower strand of said closed loop; and one drive means provided per cross-belt carriage of said cross-belt carriages, said one drive means being actuated such that each of said cross-belt carriages on said closed loop can each have an individual speed, each of said one drive means for said cross-belt carriages are actuated such that as said cross-belt carriages return on said lower strand their speed is higher ($V_{ret} > V_{sort}$) than a speed of said cross-belt carriages when traveling on said upper strand.

8. A line sorter for sorting piece goods, the line sorter comprising:

a closed loop having tracks and a plurality of cross-belt carriages, wherein the piece goods being transported in a sorting direction on an upper strand of said closed loop on said cross-belt carriages and being sorted by discharging to corresponding destination points and, wherein said cross-belt carriages return on a lower strand of said closed loop; and one drive means provided per cross-belt carriage of said cross-belt carriages, said one drive means being actuated such that each of said cross-belt carriages on said closed loop can each have an individual speed, said one drive means is a linear motor, which per said cross-belt carriage, is formed by a permanent magnet and by a series of electromagnets generating an alternating field, wherein said series of electromagnets are disposed in said upper and lower strands and one said permanent magnet is disposed in each said cross-belt carriage.

* * * * *